(12) United States Patent
Richmond

(10) Patent No.: US 7,196,477 B2
(45) Date of Patent: Mar. 27, 2007

(54) SOLAR POWERED LIGHT ASSEMBLY TO PRODUCE LIGHT OF VARYING COLORS

(76) Inventor: Simon Nicholas Richmond, Unit 3, 40-48 O'Dea Avenue, Waterloo, New South Wales 2017 (AU)

( * ) Notice: Subject to any disclaimer, the term of this patent is extended or adjusted under 35 U.S.C. 154(b) by 0 days.

(21) Appl. No.: 10/789,488

(22) Filed: Feb. 26, 2004

(65) Prior Publication Data

US 2005/0135101 A1 Jun. 23, 2005

(30) Foreign Application Priority Data

Dec. 23, 2003 (AU) ............... 2003271383

(51) Int. Cl.
*H05B 41/36* (2006.01)
(52) U.S. Cl. ..................................... 315/149
(58) Field of Classification Search ................ 315/149, 315/150, 151, 153, 154–159, 184, 188, 189; 362/194–195, 198, 200–201, 203, 249–251
See application file for complete search history.

(56) References Cited

U.S. PATENT DOCUMENTS

| 4,999,060 | A | * | 3/1991 | Szekely et al. ............. 136/251 |
| 5,062,028 | A | * | 10/1991 | Frost et al. ................. 362/183 |
| 6,120,165 | A | * | 9/2000 | Shalvi ........................ 362/276 |
| 6,528,782 | B1 | * | 3/2003 | Zhang et al. ............... 250/226 |
| 6,729,742 | B2 | * | 5/2004 | Wismeth et al. ........... 362/183 |
| 6,769,907 | B2 | * | 8/2004 | Doud ......................... 431/350 |
| 6,784,357 | B1 | * | 8/2004 | Wang ......................... 136/244 |
| 6,881,893 | B1 | * | 4/2005 | Cobert ....................... 136/246 |
| 7,064,498 | B2 | | 6/2006 | Dowling et al. |
| 2003/0137831 | A1 | * | 7/2003 | Lin ............................. 362/183 |
| 2005/0156103 | A1 | * | 7/2005 | May et al. .................. 250/228 |

* cited by examiner

*Primary Examiner*—Shih-Chao Chen
*Assistant Examiner*—Minh Dieu A
(74) *Attorney, Agent, or Firm*—Medlen & Carroll LLP

(57) ABSTRACT

A garden light (10) having a body (11) with a post (12), the lower end of which is provided with a spike (13). The upper end of the post (11) receives a lens assembly (12). Secured to the lens assembly (12) is a cap assembly (24) that has three LEDs that are activated to produce a varying color light.

29 Claims, 7 Drawing Sheets

SOLAR POWERED LIGHT ASSEMBLY TO PRODUCE LIGHT OF VARYING COLORS

TECHNICAL FIELD

The present invention relates to solar powered lights and more particularly but not exclusively to solar powered lights that produce a light of varying colour.

BACKGROUND OF THE INVENTION

Light devices that employ light emitting diode (LED) systems to produce a variable colour are known. Examples are described in U.S. Pat. Nos. 6,459,919, 6,608,458, 6,150, 774 and 6,016,038. It is also known to have "garden lights" that are solar powered. For example such garden lights include a body providing a spike that is driven into a ground surface. At the upper end of the spike there is mounted a diffuser surrounding a lamp, with the lamp being driven by rechargeable batteries and a solar cell.

The abovementioned lighting apparatus have a number of disadvantages including difficulty in adjusting the various lighting functions and not producing a uniform desired colour when required to do so.

OBJECT OF THE INVENTION

It is the object of the present invention to overcome or substantially ameliorate at least one of the above disadvantages.

SUMMARY OF THE INVENTION

There is disclosed herein a lighting device to produce light of varying colour, said device including:

a body;

a lens mounted on the body and generally enclosing a chamber having an upper rim surrounding a top opening, and a bottom region;

a reflector mounted in the bottom region;

a cap assembly including securing means to releasably engage the rim so that the cap assembly can be selectively removed from the lens; said assembly including:

a base;

a circuit having at least two lamps of different colours which are activated to produce a desired colour including a varying colour, the lamps being mounted to direct light into said chamber, a solar cell mounted on an exposed surface of the assembly and rechargeable batteries to power the circuit, a light sub-circuit connected to the lamps to deliver electric power thereto so that the lamps produce said desired colour, and a switch operable to deliver electric power from the batteries and cell to said sub-circuit, the switch being exposed to provide for access thereto by a user.

Preferably, said circuit includes a light sensitive switch that renders the circuit operation at low light levels.

Preferably, said switch is on an exposed downwardly facing surface.

Preferably, said circuit includes three lamps, each of a different colour.

Preferably, said lens is a first lens, and said device includes a second lens, said second lens being attached to said base and providing a cavity into which the LEDs direct light, with the light leaving said second lens then passing through said first lens.

Preferably, the first and second lenses diffuse light.

Preferably, said body includes a post having opposite first and second ends, with a spike attached to said first end, and said first lens attached to said second end.

Preferably, said second lens is detachably secured to said post.

Preferably, said switch is a first switch, and second sub-circuit includes an integrated circuit and a second switch connected to said integrated circuit, the second switch being exposed to provide for access thereto by a user.

Preferably, said second switch activates said integrated circuit to select a desired colour.

Preferably, said second switch is on said exposed surface.

There is further disclosed herein a lighting device to produce light of varying colour, said device including:

a body;

a lens mounted on the body and generally enclosing a chamber;

a circuit having at least two lamps of different colours to produce a desired colour including a varying colour, the lamps being mounted to direct light into said chamber, connections for at least one rechargeable battery to power the circuit and a solar cell mounted on an exposed surface of the assembly and operatively associated with the connections to charge the battery, and a switch operated to control delivery of electric power from the battery to operate said circuit, the switch being exposed to provide for access thereto by a user.

Preferably, said circuit includes a light sensitive switch that renders the circuit operative at low light levels.

Preferably, said circuit includes a light sub-circuit connected to the lamps to deliver electric power thereto so that the lamps produce said desired colour, with said switch being an on/off switch to deliver electric power from the batteries to said sub-circuit.

Preferably, said circuit includes a light sub-circuit having an integrated circuit operable to select a desired fixed colour, with said switch being connected to said integrated circuit and operable to select said desired fixed colour.

Preferably, said circuit includes a sub-circuit, said switch is a first switch said first switch being an on/off switch to deliver electric power from the battery to said sub-circuit, and said sub-circuit includes an integrated circuit and a second switch connected to said integrated circuit, the second switch being operable to select a desired fixed colour and exposed to provide for access thereto by a user.

Preferably, said second switch is on said exposed external surface.

BRIEF DESCRIPTION OF THE DRAWINGS

A preferred form of the present invention will now be described by way of example with reference to the accompanying drawings wherein.

DETAILED DESCRIPTION OF THE PREFERRED EMBODIMENTS

Figure 1:
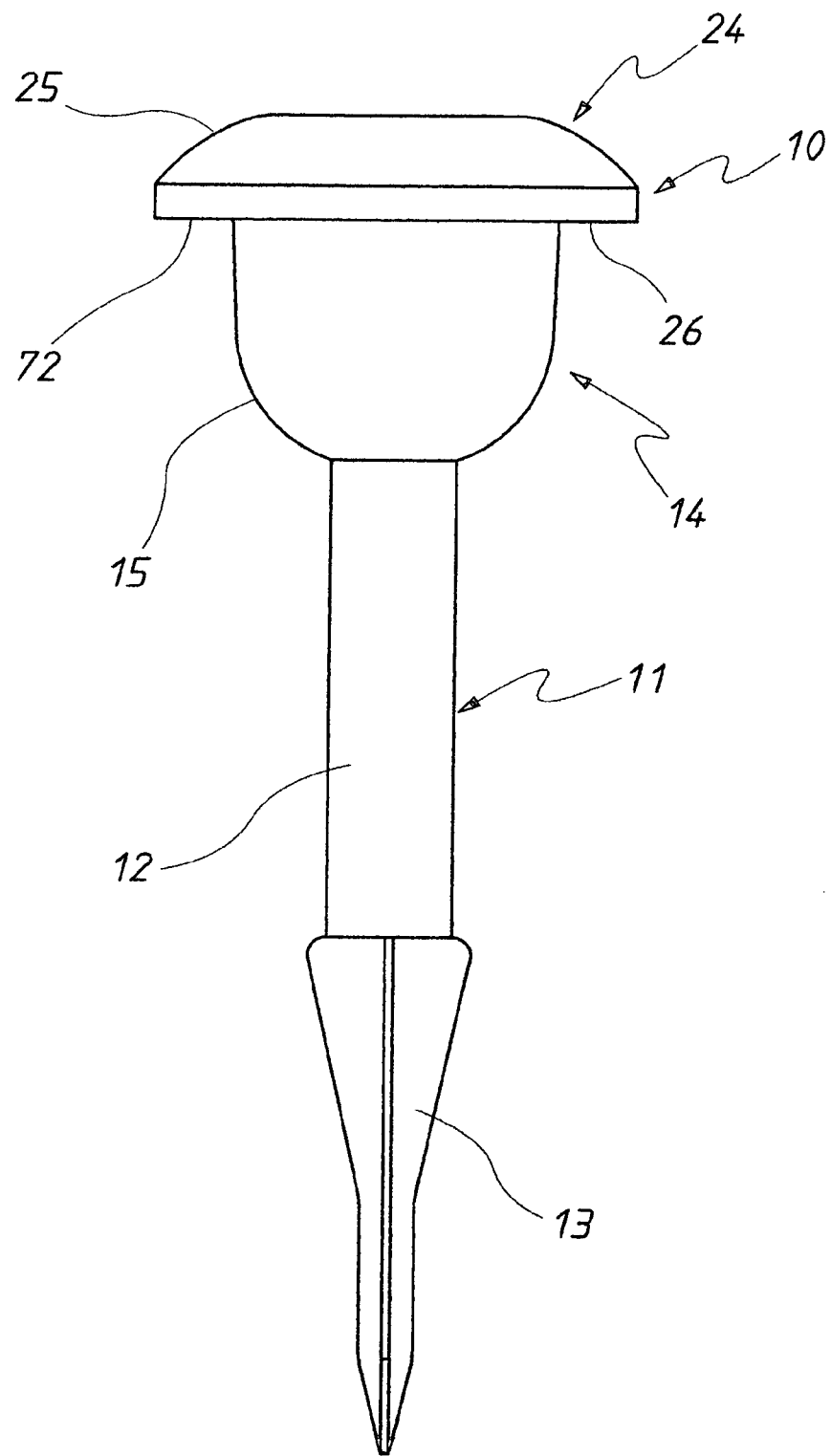
FIG. 1 is a schematic side elevation of a lighting device.
Figure 2:
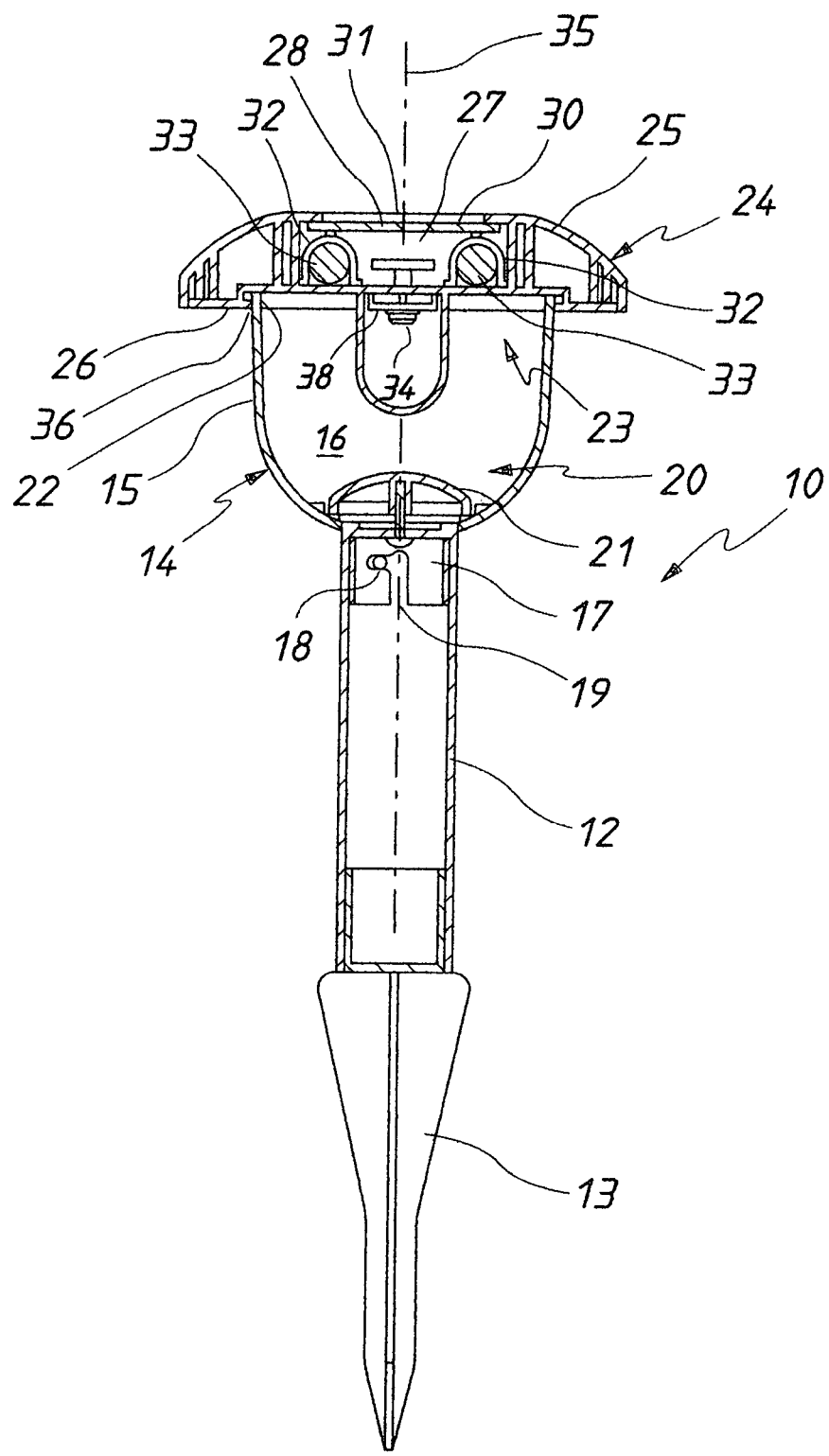
FIG. 2 is a schematic sectioned front elevation of the device of FIG. 1.
Figure 3:
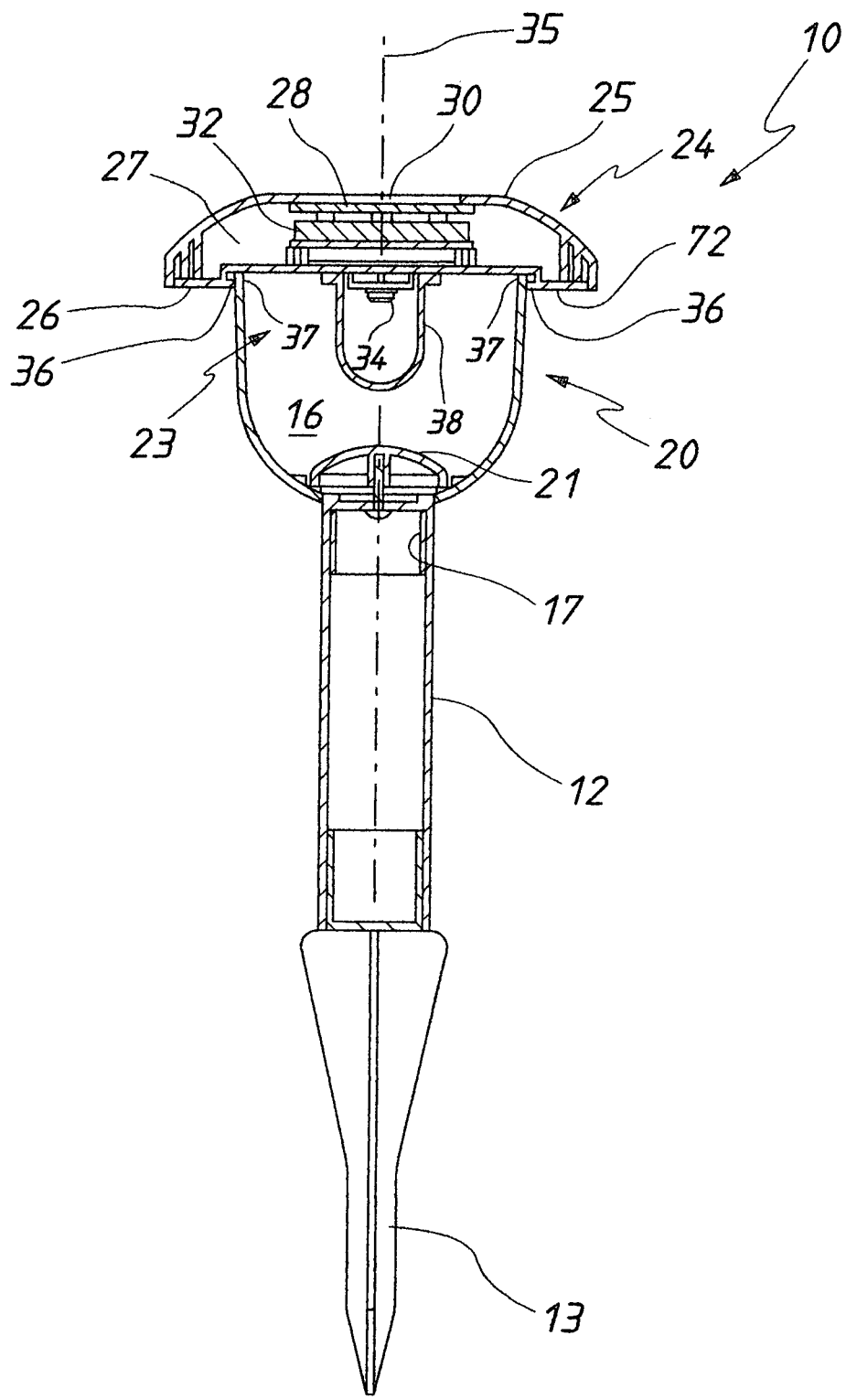
FIG. 3 is a schematic sectioned side elevation of the device of FIG. 1.
Figure 4:
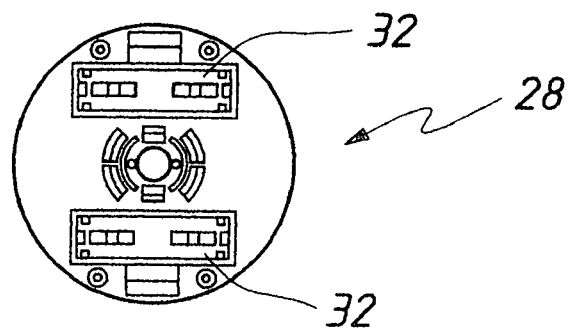
FIG. 4 is a schematic plan view of a moulding employed in the device of FIG. 1.
Figure 5:
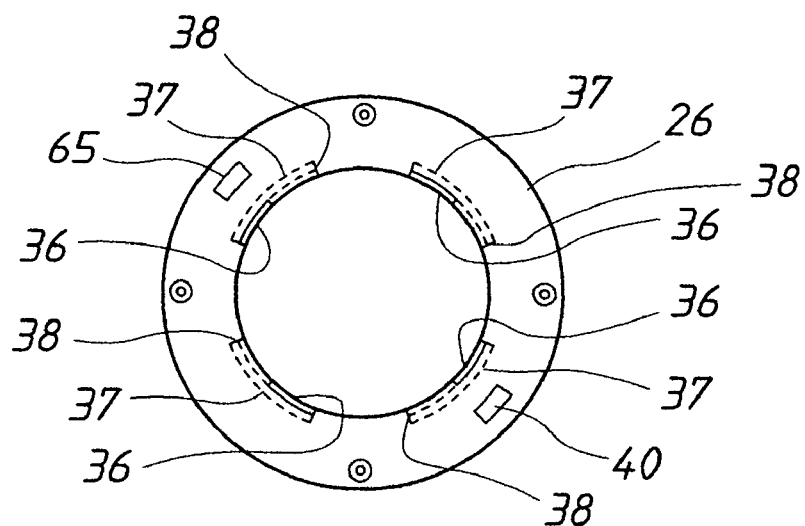
FIG. 5 is a schematic plan view of a base member of the device of FIG. 1.
Figure 6:
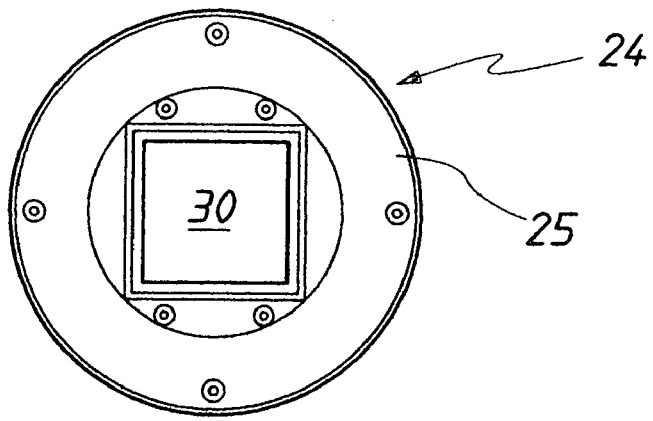
FIG. 6 is a schematic to plan view of a cap assembly employed in the device of FIG. 1.
Figure 7:
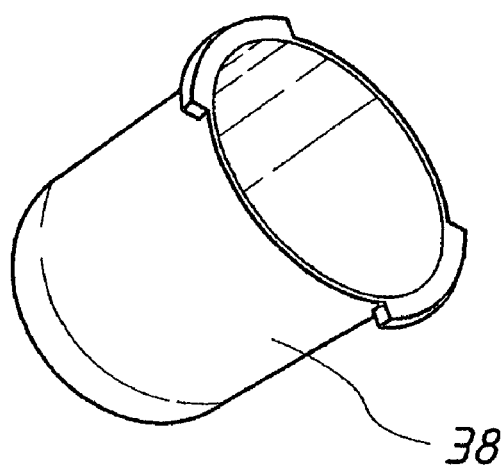
FIG. 7 is a schematic isometric view of a lens employed in the device of FIG. 1.
Figure 8:
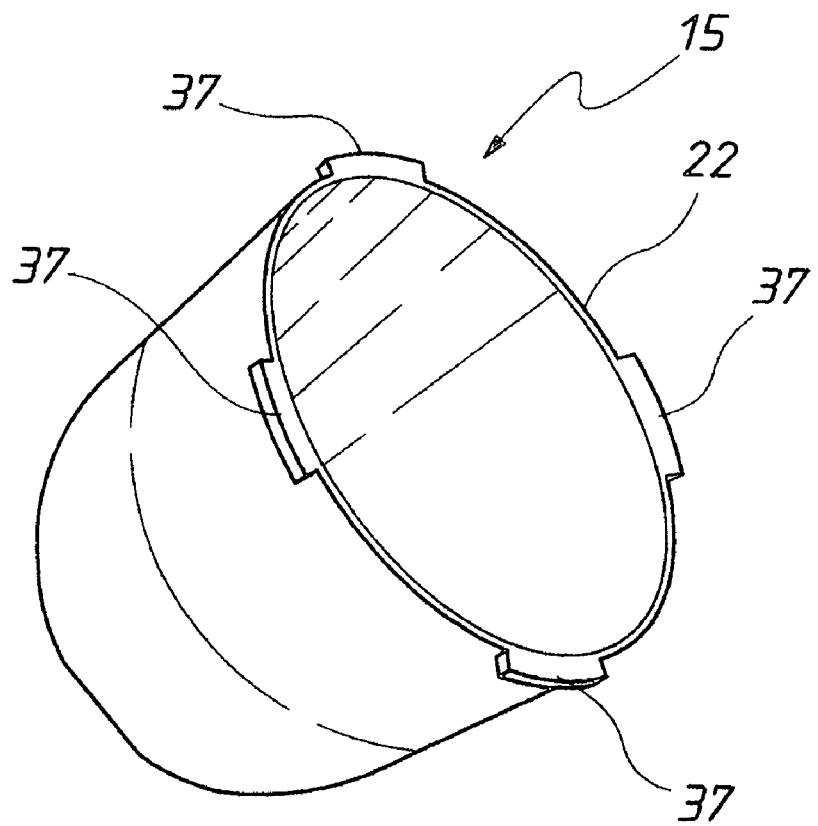
FIG. 8 is a schematic isometric view of a second lens employed in the device of FIG. 1.

In FIGS. 1 to 9 of the accompanying drawings there is schematically depicted a lighting device 10. The device 10 of this embodiment is configured as a "garden light". The device 10 includes a body 11 including a post 12 from the lower end from which there extends a spike 13. The spike 13 is driven into a ground surface so that the post 12 is exposed above the ground surface.

Attached to the upper end of the post 12 is a lens assembly 14. The lens assembly 14 includes a lens 15 that encompasses a chamber 16. The lower end of the lens 15 has fixed to it a "bayonet" fitting 17 that engages a shaft 18 fixed to the upper end of the post 12. The fitting 17 includes an "L" shaped slot 19 through which the shaft 18 passes to secure the lens assembly 14 to the upper end of the post 12.

The chamber 16 includes a lower portion 20 within which there is mounted an arcuate reflector 21 that is concave.

The lens 15 has a rim 22 surrounding the upper opening 23 of the lens 15.

Removably attached to the rim 22 is a cap assembly 24. The assembly 24 includes a cover 25 fixed to a base 26. The base 26 is located beneath the cover 25 and is shielded thereby. The base 26 and cover 25 encompass a chamber 27 within which there is a mounted moulding 28. The moulding 28 is provided with battery compartments 32. The components of the circuit 29 are located within the chamber 27, while the upper surface of the assembly 27 is provided with the solar cell 30. The cell 30 is exposed through a central rectangular aperture 31 of the cap 25.

Mounted within the chamber 27 via battery compartments 32 are rechargeable batteries 33 which are used to energise three LEDs 34. The LEDs 34 when illuminated produce red, green and blue light.

The cap assembly 24 is generally circular in configuration so as to provide the device 10 with a generally vertical longitudinal axis 35.

The base 26 has radially inward projecting flange segments 36 that engage with radially outward extending flange segments 37 of the rim 22 to be secured thereto. By angular movement of the cap assembly 24 about the axis 35, the segments 36 and 37 engage or disengage to secure or to release the assembly 24 with respect to the lens 15. As can be noted from FIG. 5, the flange segments 27 have end abutment portions 38 against which these segments 36 engage when the assembly 24 is secured to the lens 15.

Mounted on the under surface of the base 26 is a second lens 38. Accordingly, the LEDs 34 when activated have their light preferably diffused by the lens 38 and then further diffused by the lens 15. This in particular aids in producing a more evenly coloured light when the LEDs 34 are activated.

The circuit 29 powers and controls the lighting device 10 in accordance with an embodiment of this invention. The circuit 29 consists of a number of interconnected sub-circuits, including a power supply circuit, a light operated circuit, a boost-up circuit, a rectifier circuit, and a light circuit.

The power supply circuit comprises a solar cell 30 connected in series to a forward biased diode 39, which is in turn connected to a positive terminal of a battery 33. A negative terminal of the battery 33 is then connected to the solar cell 30 to complete the power supply circuit. In this example, the diode 39 is a model number IN5817 Schottky diode and the battery comprises two rechargeable 1.2 volt battery cells. It will be apparent to a person skilled in the art that other diode and battery configurations may be utilised without departing from the spirit and scope of the invention.

When the solar cell 30 is exposed to sufficient light, the solar cell converts some of the solar energy to electrical energy and creates a current that passes through the diode 39 to charge the battery 33. Thus, during the day the solar cell 30 converts energy from the sun to charge the battery 33. The diode 39 prevents the battery 33 from expending any power on the solar cell 30.

The power supply circuit is connected in parallel to the light operated circuit, which is connected across the terminals of the battery 33. The positive terminal of the battery 33 is connected to a switch 40, which is in turn connected to a 100 kΩ first resistor 41. The first resistor 41 is connected in series with a second, light-dependent resistor 42. The second resistor 42 connects to the negative terminal of the batteries 33 to complete the light operated circuit. The value of resistance of the second resistor 42 depends on the amount of light to which the second resistor 42 is exposed. When there is not much light, such as occurs during the night, the value of the second resistor 42 increases. During the day-time, when there is sufficient light, the value of the second resistor 42 decreases. Accordingly the resistor 42 allows the lighting device to operate only when there is insufficient light, ie night.

The boost-up circuit is connected to the light operated circuit, in parallel with the first resistor 41 and the second, light-dependent resistor 42. A first circuit node 43 is defined between the switch 40 and the first resistor 41. Connected to the node 43, is an emitter terminal of a first triode 44. A collector terminal of the first triode 44 is connected in series with a 100 kΩ third resistor 45. The third resistor 45 is then connected to a point between the first resistor 41 and the second resistor 42.

A 220 kΩ fourth resistor 46 is connected to node 43 across the emitter and base terminals of the first triode 44. In parallel with the fourth resistor 46, and also connected across the emitter and base terminals of the first triode 44, is a 4.7 nF first capacitor 48. Further connected to node 43, across the emitter and base terminals of the first triode 44 and in parallel with each of the fourth resistor 46 and the first capacitor 48, is a 100 μH inductor 49 in series with a 1 nF second capacitor 50. The second capacitor is then connected to the base terminal of the first triode 44.

A 20 kΩ fifth resistor 51 is connected across the base and collector terminals of the first triode 44. Connected across the terminals of the third resistor 45 are the collector and base terminals, respectively, of a second triode 52. The emitter terminal of the second triode 52 is connected to the negative terminal of the batteries 33.

Connected between the inductor 49 and the second capacitor 50 is the collector terminal of a third triode 53. The base terminal of the third triode 53 is connected via an intermediary circuit to the collector terminal of the second triode 52. The intermediary circuit consists of a 2.4 kΩ fourth resistor 54 in parallel with a 1 nF third capacitor 55. The emitter terminal of the third triode 53 is connected to the negative terminal of the battery 33.

Also connected between the inductor 49 and the second capacitor 50 is the rectifier circuit. A forward biased second diode 56 is connected to a point between the inductor 49 and the second capacitor 50, and then to a positive terminal of a 33 µF fourth capacitor 57. The negative terminal of the fourth capacitor 57 is connected to the negative terminal of the battery 33. A second circuit node 58 is defined between the second diode 56 and the fourth capacitor 57. Connected in parallel with the fourth capacitor 57, between the second node 58 and the negative terminal of the battery 33 is a reverse biased 4.5V third diode 59. The second diode 56, the fourth capacitor 57 and the third diode 59 comprise the rectifier circuit. Further connected to the second circuit node 58, in parallel with each of the capacitor 57 and the reverse diode 59, is a light circuit 60.

The light circuit 60 contains an integrated circuit (IC) 61 for controlling lighting effects provided by the lighting device 10. In the embodiments shown, the IC 61 is a 16-pin, three colour LED IC for controlling first, second and third light emitting diodes (LEDs) 34A, 34B and 34C. Each of pins 1, 15 and 16 is connected in series to respective switches 69, 70. 71. Each of the switches 69, 70 and 71 is then connected to the negative terminal of the battery 33. In one embodiment, the switches 69, 70, 71 correspond to the LEDs 34A, 34B, and 34C to enable or disable a particular colour range. In another embodiment, the switches 69, 70, 71 determine the frequency of a colour changing effect. In a further embodiment, the switches 69, 70, 71 determine the intensity of light emitted by each of the LEDs 34A, 34B, and 34C. Various combinations of the frequency and intensity of light are also possible. The switches 69, 70, 71 can be made accessible to a user to create custom lighting effects. Alternatively, the switches 69, 70, 71 are set according to a predetermined configuration and are not readily accessible by a user.

Pin 4 of the IC 61 enables an optional pause function. In this embodiment, pin 4 connects to a push button 65 that is, in turn, connected to the negative terminal of the batteries 33. Pin 3 of the IC 61 connects to the second circuit node 58.

Connected to the second circuit node 58, and in parallel with one another, are the first second and third forward biased light emitting diodes (LEDs) 34A, 34B and 34C. The first LED 34A is connected in series with a sixth resistor 66 that is connected to pin 13 of the IC 61. The second LED 34B is connected in series with a seventh resistor 67 that is connected to pin 12 of the IC 61. The third LED 34C is connected in series with an eighth resistor 68 that is connected to pin 11 of the IC 61. In this example, the first LED 34A is blue, the second LED 34B is green and the third LED 34C is red.

Pins 6 and 8 of the IC 61 are tied to one another via a ninth resistor 72, which in the embodiment shown is a 20KΩ resistor. The valve of the ninth resistor 72 determines the frequency of a colour change created by the IC 61. Accordingly, using different resistor values for the ninth resistor 72 produces colour changes of different frequencies. Pin 9 of the IC 61 is tied to the negative terminal of the battery 33.

During the day, the solar cell 30 charges the battery 33. The value of the second resistor 42 is low and, consequently, small amounts of current flow through the boost-up circuit, rectifier circuit and light circuit. As night falls, the amount of energy converted by the solar cell 30 decreases. The resistance of the second resistor 42 increases and more current flows into the boost-up circuit, rectifier circuit and light circuit. This activates the LEDs 34A, 34B, and 34C in the light circuit and the light device 10 produces a changing light effect.

The integrated circuit 61 controls each of the first, second and third LEDs 34A, 34B, and 34C to produce a changing light effect for the light device 10. The integrated circuit varies the frequency and intensity of light emitted by the LEDs 34A, 34B, and 34C to produce a constantly changing kaleidoscopic effect. The light device 10 displays a constantly changing lighting effect that cycles through the light spectrum by ramping up and ramping down the intensity of light displayed by the LEDs 34A, 34B, and 34C.

Connecting the optional pause function of pin 4 of the IC 61 to the push button 65 enables a user to stop the changing light effect and maintain a constant colour. In this manner, a user can select a preferred colour for a lighting effect. The user observes the changing colour effect and when a desired colour is displayed, the user depresses the pause button 65.

The colour displayed at the time that the button is pressed then remains on. Preferably, the circuit retains sufficient charge such that a user selected colour is retained during the day and is displayed again when the light is reactivated the following evening. In this manner, the user does not have to reselect a desired colour each night. To reinstate the changing light effect, the user presses the push button 65 again and the changing light effect resumes.

Figure 9:
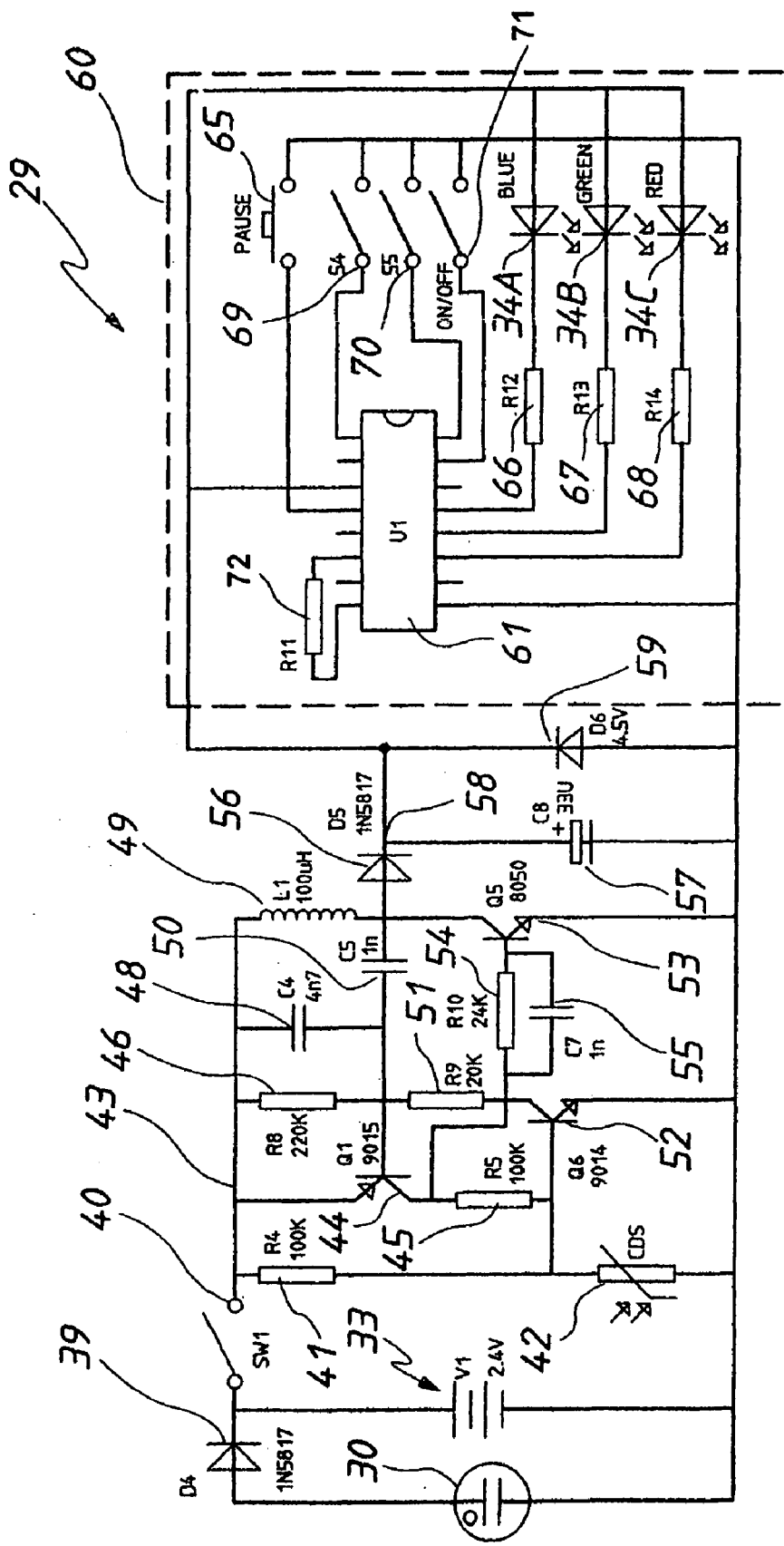
FIG. 9 is a circuit diagram of the circuit of the board of FIG. 4.

In the embodiment shown in FIG. 9, the battery 33 powers the light circuit 60 during the night to produce light of varying colours and the user can optionally select a desired colour by pushing the push button 65. A selected colour is retained by memory in the IC 61. The memory may be a switch. Whilst the battery is powering the light circuit 60, the fourth capacitor 57 stores charge. As stated above, it is desirable for a selected colour to be retained and displayed on successive nights. As the battery 33 discharges, the output voltage of the battery 33 decreases. When the output voltage of the battery 33 is less than the stored voltage of the capacitor 57, the capacitor 57 discharges. Due to the presence and arrangement of the diodes 56 and 59, the capacitor 57 discharges through the light circuit 60.

The IC 61 preferably includes a cut-off circuit that is voltage dependent. As the capacitor 57 discharges, the voltage across the cut-off circuit decreases. Once the voltage across the cut-off circuit reaches a predetermined threshold value, the cut-off circuit prevents further power being consumed by the LEDs. As no power is being consumed by the light circuit 60, the capacitor 57 retains a residual charge. The residual charge maintains a voltage across the IC 61, which enables the selected colour to be retained by the memory in the IC 61.

During the next day, the solar cell 30 recharges the battery 33. As night falls, the resistance of resistor 42 again increases and the battery 33 provides sufficient power to the light circuit 60 to increase the voltage across the cut-off circuit above the predetermined threshold value. The LEDs are activated and the selected colour, as retained in the memory of the IC 61, is displayed. The voltage provided by the battery 33 is more than the stored charge of the fourth capacitor 57, so the capacitor 57 again begins to store charge.

It will be readily apparent to a person skilled in the art that there are many circuit variations possible for enabling and controlling the lighting display, without departing from the spirit and scope of the invention.

The switch 40 and/or switch 65 is/are mounted on the base 26 so as to be on a downwardly facing external surface of the base 26. This enables a user to control the device via readily accessible switches, without needing to remove the cap assembly 24. The switches 40 and 65 are each operable to control delivery of electric power from the batteries to the LEDs 34A, 34B and 34C. The circuit 29 is only rendered operative when there is insufficient light, that is, by operation of a light sensitive switch, ie the diode 43.

Figure 10:
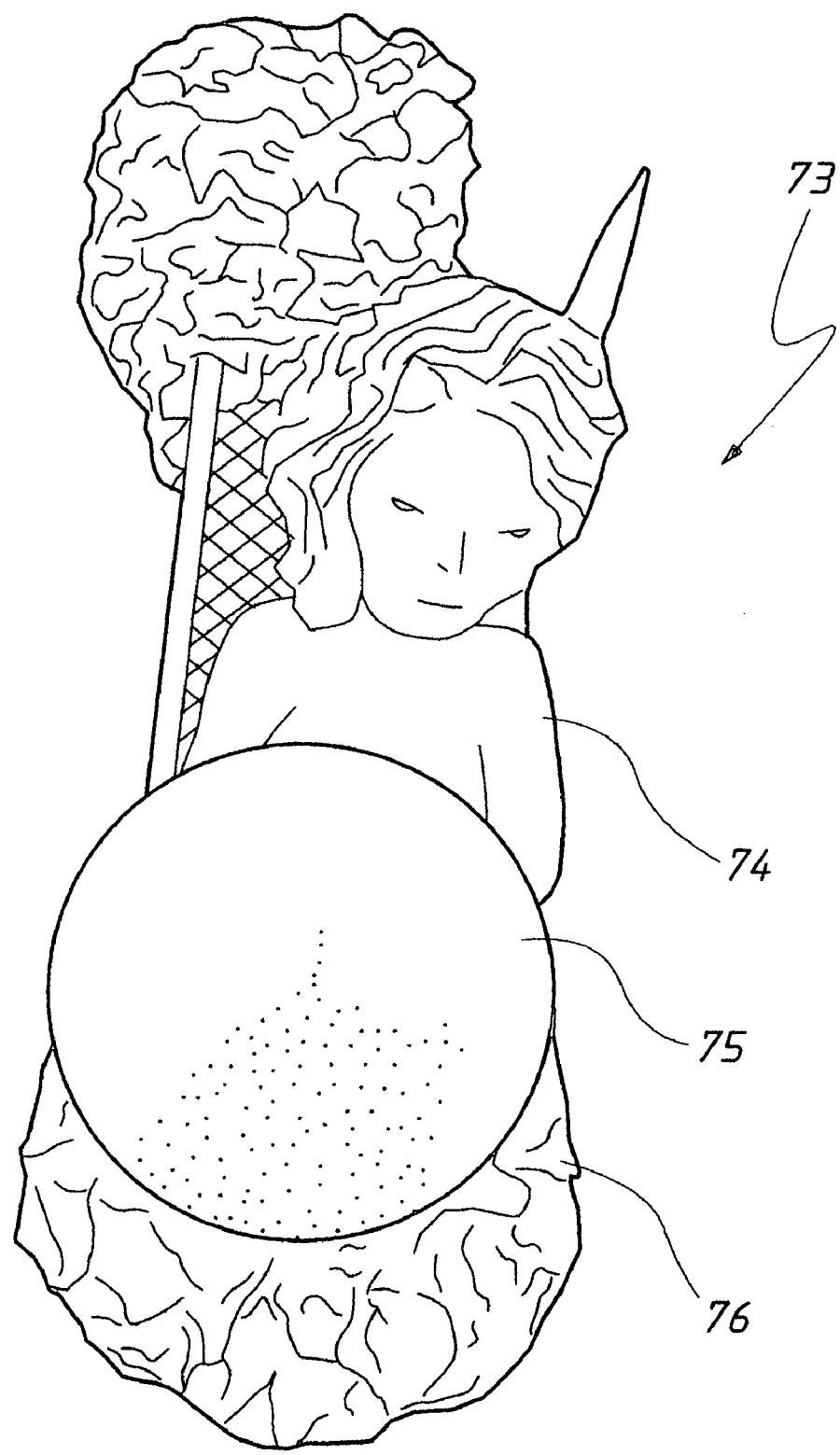
FIG. 10 is a schematic perspective view of an ornamental garden light.

The embodiment of FIG. 10 includes an ornamental garden light 73 having a body or base 74. The base 74 would be at least partly hollow so as to contain the circuitry of FIG. 9, except for the solar cell 30. The solar cell 30 would be mounted so as to be exposed to sunlight. The switches 40 and 65 would be mounted at an external surface of the base 74.

The switch 40 and/or switch 65 would be mounted on an external surface of the base 74, while the diode 42 would be exposed to sunlight.

The base 74 includes a spherical lens 75 secured to a horizontal portion 76 of the base 74. The horizontal portion 76 would have mounted in it the LEDs 34A, 34B and 34C so as to deliver light to the interior of the lens 75.

The invention claimed is:

1. A lighting device to produce light of varying colour, said device including:
    a body including a spike;
    a lens mounted on the body and generally enclosing a chamber having an upper rim surrounding a top opening, and a bottom region;
    a cap assembly including securing means to releasably engage the rim so that cap assembly can be selectively removed from the lens; assembly including:
    a base
    a circuit having at least two lamps of different colours to produce a desired colour including varying colour, the lamp being mounted to direct light into said chamber, connection for at least one rechargeable battery to light and operatively associated with the a surface of the assembly so as to be exposed to light and operatively associated with the connections to charge the battery, and a switch operated to control delivery of electric power from the battery to operate said circuit, the switch being exposed to provide for access thereto a user.

2. The light device of claim 1 wherein, said circuit includes a light sensitive switch that renders the circuit operation at low light levels.

3. The device of claim 2 wherein, said switch is on an exposed downwardly facing surface.

4. The device of claim 1 wherein, said circuit includes three lamps, each of a different colour.

5. The device of claim 1 wherein, said lens is a first lens, and said device includes a second lens, said second lens being attached to said base and providing a cavity into which the LEDs direct light, with the light leaving said second lens then passing through said first lens.

6. The device of claim 5 wherein, the first and second lenses diffuse light.

7. The device of claim 6 wherein, said body includes a post having opposite first and second ends, with said spike attached to said first end, and said first lens attached to said second end.

8. The device of claim 7 wherein, said second lens is detachably secured to said post.

9. The lighting device of claim 1 wherein, said circuit includes a light sub-circuit connected to the lamps to deliver electric power thereto so that the lamps produce said desired colour, with said switch being an on/off switch to deliver electric power from the batteries to said sub-circuit.

10. The device of claim 9 wherein, said switch is a first switch, and said sub-circuit includes an integrated circuit and a second switch connected to said integrated circuit, the second switch being operable to select a desired fixed colour and exposed to provide for access thereto by a user.

11. The device of claim 10 wherein, said second switch is on said exposed external surface.

12. The lighting device of any one of claim 1 wherein, said circuit includes a light sub-circuit having an integrated circuit operable to select a desired fixed colour, with said switch being connected to said integrated circuit and operated to select said desired fixed colour.

13. The device of claim 1 wherein, said switch is on an exposed downwardly facing surface.

14. The device of claim 13 wherein, said circuit includes three lamps, each of a different colour.

15. The device of claim 14 wherein, said lens is a first lens, and said device includes a second lens, said second lens being attached to said base and providing a cavity into which the LEDs direct light, with the light leaving said second lens then passing through said first lens.

16. The lighting device of claim 14 wherein, said circuit includes a light sub-circuit connected to the lamps to deliver electric power thereto so that the lamps produce said desired colour, with said switch being an on/off switch to deliver electric power from the batteries to said sub-circuit.

17. The device of claim 16 wherein, said switch is a first switch, and said sub-circuit includes an integrated circuit and a second switch connected to said integrated circuit, the second switch being operable to select a desired fixed colour and exposed to provide for access thereto by a user.

18. The device of claim 17 wherein, said second switch is on said exposed external surface.

19. The lighting device of claim 14 wherein, said circuit includes a light sub-circuit having an integrated circuit operable to select a desired fixed colour, with said switch being connected to said integrated circuit and operated to select said desired fixed colour.

20. A lighting device to produce light of varying colour, said device including:
    a body including a spike;
    a lens connected to the body;
    a circuit having at least two lamps of different colours to produce a desire colour including a varying colour, the lamps being mounted to direct light into said lens, connections for at least one rechargeable battery to power the circuit and a solar cell mounted on a surface of the assembly so as to be exposed to light and operatively associated with the connections to charge the battery, and a user operated switch operable to control delivery of electric power from the battery to operate said circuit, the switch being exposed to provide for access thereto by a user thereby enabling a user to manipulate the switch to control the delivery of electric power from the battery.

21. The lighting device of claim 20 wherein, said circuit includes a light sensitive switch that renders the circuit operative at low light levels.

22. The lighting device of claim 21 wherein, said circuit includes a light sub-circuit connected to the lamps to deliver electric power thereto so that the lamps produce said desired colour, with said switch being an on/off switch to deliver electric power from the batteries to said sub-circuit.

23. The lighting device of claim 22 wherein, said circuit includes a light sub-circuit having an integrated circuit operable to select a desired fixed colour, with said switch being connected to said integrated circuit and operable to select said desired fixed colour.

24. The device of claim 21 wherein, said circuit includes a sub-circuit, said switch is a first switch said first switch being an on/off switch to deliver electric power from the battery to said sub-circuit, and said sub-circuit includes an integrated circuit and a second switch connected to said integrated circuit, the second switch being operable to select a desired fixed colour and exposed to provide for access thereto by a user.

25. The device of claim 24 wherein, said second switch is on said exposed external surface.

26. The lighting device of claim 20 wherein, said circuit includes a light sub-circuit connected to the lamps to deliver electric power thereto so that the lamps produce said desired colour, with said switch being an on/off switch to deliver electric power from the batteries to said sub-circuit.

27. The lighting device of claim 20 wherein, said circuit includes a light sub-circuit having an integrated circuit operable to select a desired fixed colour, with said switch being connected to said integrated circuit and operable to select said desired fixed colour.

28. The device of claim 20 wherein, said circuit includes a sub-circuit, said switch is a first switch said first switch being an on/off switch to deliver electric power from the battery to said sub-circuit, and said sub-circuit includes an integrated circuit and a second switch connected to said integrated circuit, the second switch being operable to select a desired fixed colour and exposed to provide for access thereto by a user.

29. The device of claim 28 wherein, said second switch is on said exposed external surface.

* * * * *

UNITED STATES PATENT AND TRADEMARK OFFICE
CERTIFICATE OF CORRECTION

PATENT NO.         : 7,196,477 B2
APPLICATION NO. : 10/789488
DATED                  : March 27, 2007
INVENTOR(S)       : Simon Nicholas Richmond It is certified that error appears in the above-identified patent and that said Letters Patent is hereby corrected as shown below:

On the title page, please correct item (75) Inventor: to read as follows:
    (75) Simon Nicholas Richmond, Princeton, NJ (US)

On the title page, please correct item (57) ABSTRACT to read as follows:
    A garden light 10 having a body (11) with a post (12), the lower end of which is provided with a spike (13). The upper end of the post (11) receives a lens assembly (14). Secured to the lens assembly (14) is a cap assembly (24) that has three LEDs that are activated to produce a varying colour light.

Column 3 at line 53, please replace "flange segments 27" with --flange segments 37--.

Column 7, please correct Claim 1 to read as follows:
    A lighting device to produce light of varying colour, said device including:
    a body including a spike;
    a lens mounted on the body and generally enclosing a chamber having an upper rim surrounding a top opening, and a bottom region;
    a cap assembly including securing means to releasably engage the rim so that the cap assembly can be selectively removed from the lens; said assembly including:
    a base; and
    a circuit having at least two lamps of different colours to produce a desired colour including a varying colour, the lamps being mounted to direct light into said chamber, connections for at least one rechargeable battery to power the circuit and a solar cell mounted on a surface of the assembly so as to be exposed to light and operatively associated with the connections to charge the battery, and a switch operated to control delivery of electric power from the battery to operate said circuit, the switch being exposed to provide for access thereto by a user.

Claim 2 at line 42, please replace "operation" with --operative--.

Claim 5 at line 50, and Claim 15 at line 17, please replace "the LEDs" with --the lamps--.

Claim 12 at line 5, please replace "device of any one of claim 1" with --device of claim 1--.

UNITED STATES PATENT AND TRADEMARK OFFICE
CERTIFICATE OF CORRECTION

PATENT NO. : 7,196,477 B2
APPLICATION NO. : 10/789488
DATED : March 27, 2007
INVENTOR(S) : Simon Nicholas Richmond It is certified that error appears in the above-identified patent and that said Letters Patent is hereby corrected as shown below:

Column 8, please correct Claim 20 to read as follows:
    A lighting device to produce light of varying colour, said device including:
    a body including a spike;
    a lens connected to the body;
    a circuit having at least two lamps of different colours to produce a <u>desired</u> colour including a varying colour, the lamps being mounted to direct light into said lens, connections for at least one rechargeable battery to power the circuit and a solar cell mounted on a surface of <u>an</u> assembly so as to be exposed to light and operatively associated with the connections to charge the battery, and a user operated switch operable to control delivery of electric power from the battery to operate said circuit, the switch being exposed to provide for access thereto by a user thereby enabling <u>the</u> user to manipulate the switch to control the delivery of electric power from the battery.

Signed and Sealed this

First Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,196,477 B2
APPLICATION NO. : 10/789488
DATED : March 27, 2007
INVENTOR(S) : Simon Nicholas Richmond It is certified that error appears in the above-identified patent and that said Letters Patent is hereby corrected as shown below:

On the title page, please correct item (75) Inventor: to read as follows:
 (75) Simon Nicholas Richmond, Princeton, NJ (US)

On the title page, please correct item (57) ABSTRACT to read as follows:
 A garden light 10 having a body (11) with a post (12), the lower end of which is provided with a spike (13). The upper end of the post (11) receives a lens assembly (14). Secured to the lens assembly (14) is a cap assembly (24) that has three LEDs that are activated to produce a varying colour light.

Column 3 at line 53, please replace "flange segments 27" with --flange segments 37--.

Column 7, please correct Claim 1 lines 19-39 to read as follows:
 A lighting device to produce light of varying colour, said device including:
 a body including a spike;
 a lens mounted on the body and generally enclosing a chamber having an upper rim surrounding a top opening, and a bottom region;
 a cap assembly including securing means to releasably engage the rim so that the cap assembly can be selectively removed from the lens; said assembly including:
 a base; and
 a circuit having at least two lamps of different colours to produce a desired colour including a varying colour, the lamps being mounted to direct light into said chamber, connections for at least one rechargeable battery to power the circuit and a solar cell mounted on a surface of the assembly so as to be exposed to light and operatively associated with the connections to charge the battery, and a switch operated to control delivery of electric power from the battery to operate said circuit, the switch being exposed to provide for access thereto by a user.

Column 7, Claim 2 at line 42, please replace "operation" with --operative--.

Column 7, Claim 5 at line 50, and Claim 15 at line 17, please replace "the LEDs" with --the lamps--.

Column 8, Claim 12 at line 5, please replace "device of any one of claim 1" with --device of claim 1--.

UNITED STATES PATENT AND TRADEMARK OFFICE
CERTIFICATE OF CORRECTION

PATENT NO. : 7,196,477 B2
APPLICATION NO. : 10/789488
DATED : March 27, 2007
INVENTOR(S) : Simon Nicholas Richmond It is certified that error appears in the above-identified patent and that said Letters Patent is hereby corrected as shown below:

Column 8, please correct Claim 20 lines 36-52 to read as follows:
    A lighting device to produce light of varying colour, said device including:
    a body including a spike;
    a lens connected to the body;
    a circuit having at least two lamps of different colours to produce a <u>desired</u> colour including a varying colour, the lamps being mounted to direct light into said lens, connections for at least one rechargeable battery to power the circuit and a solar cell mounted on a surface of <u>an</u> assembly so as to be exposed to light and operatively associated with the connections to charge the battery, and a user operated switch operable to control delivery of electric power from the battery to operate said circuit, the switch being exposed to provide for access thereto by a user thereby enabling <u>the</u> user to manipulate the switch to control the delivery of electric power from the battery.

This certificate supersedes the Certificate of Correction issued July 1, 2008.

Signed and Sealed this

Twenty-second Day of July, 2008

JON W. DUDAS
*Director of the United States Patent and Trademark Office*